Sept. 28, 1948.                H. A. ALCORN                2,450,217
                              TEAT DRAINING TUBE
                            Filed Nov. 16, 1944
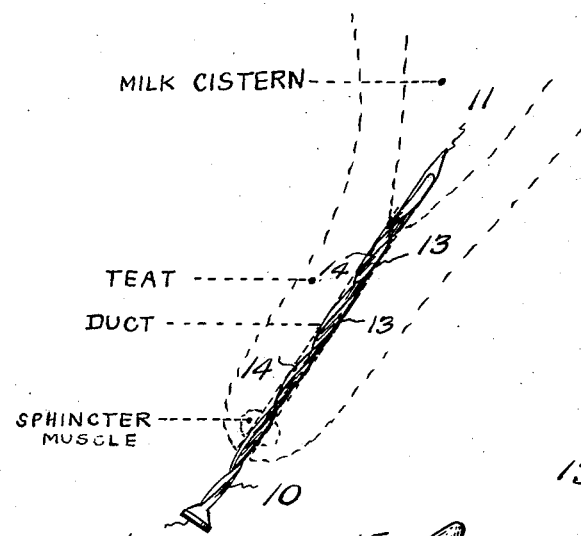
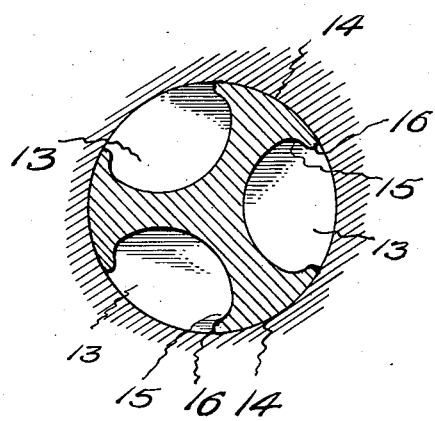
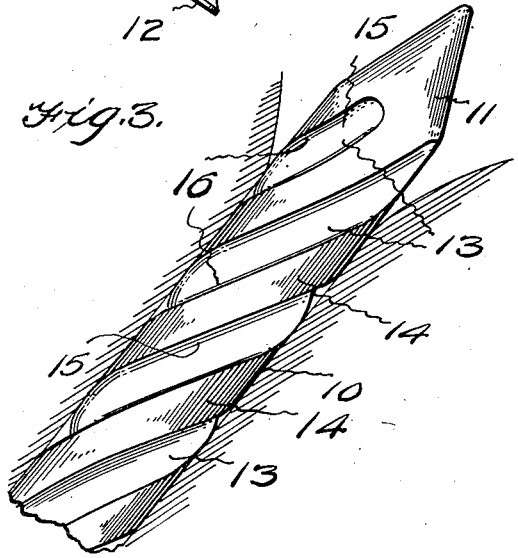
Inventor
HARVEY A. ALCORN
By
                    Attorney Patented Sept. 28, 1948

2,450,217

UNITED STATES PATENT OFFICE 2,450,217

TEAT DRAINING TUBE

Harvey A. Alcorn, Adair, Iowa

Application November 16, 1944, Serial No. 563,773

1 Claim. (Cl. 128—350)

This invention relates to a quarter and teat-draining tube, and has for one of its objects the production of a simple and efficient means for draining milk from the cow's udder and teat when there has been injury thereto, or where surgery has been performed thereon, thereby draining the injured parts so as to prevent infection and in this way aid in the healing of the wound.

A further object of this invention is the production of a teat-draining tube which is so constructed as to cause the milk to drain on the outside of the tube and continuously flush the duct of the teat, since the tube remains in place until the wounds are healed, the spiral grooves providing a screw type tube to cause the tube to stay in the teat and thereby making the instrument self-retaining, the constant flushing of the duct on the outside of the tube preventing infection.

Other objects and advantages of this invention will appear throughout the following specification and claim.

In the drawing—

Figure 1 is a side view of the teat draining tube in its approximate size and illustrating the same in postion, the teat being shown in dotted lines;

Figure 2 is an enlarged fragmentary side view of the inner end of the draining tube, the side walls of the duct of the teat being shown in section; and Figure 3 is a transverse sectional view of the tube.

By referring to the drawing, it will be seen that 10 designates the teat draining tube which comprises an elongated body of a relatively small diameter. The inner end of the body is provided with a tapering terminal 11 to facilitate the insertion of the tube into the teat. A head or knob 12 is carried by the outer or opposite end of the body to prevent the tube from working or moving inside the teat, as well as to facilitate the removal of the tube from the teat.

The body 10 is made of plastic, or any desired material, which will withstand antiseptics and permit of proper sterilization. The body 10 is preferably circular in cross-section, as shown in detail in Figure 2, and the body 10 is provided with longitudinally arranged spiral grooves or channels 13 which are formed upon and communicate with the periphery of the body 10. The formation of the channels 13 will define spaced spiral ribs 14 having rounded outer faces which fit snugly against the walls of the duct of the teat as shown in Figures 2 and 3. This arrangement will tend to prevent injury to the teat while the tube is in place. The channels or grooves 13 are preferably concave in cross-section, and are dished inwardly of the tube. The sides of the channels or grooves 13 are preferably undercut or dished, as at 15, near the side edges of the ribs 14 and the extremities of the edges are preferably slightly rounded, as at 16, to prevent cutting of the teat.

It should be understood that the tube may be provided with any desired number of channels, such as the channels 13, preferably from one to five, and that certain detail changes may be employed without departing from the spirit of the invention so long as these changes fall within the scope of the appended claim.

The present device has been produced to take care of the milk from the udder of a cow when there has been an injury to the teat from cuts, bruises, cracks, tumors, and the like, in the duct, and to avoid infection. Under such conditions, it is necessary to establish drainage to avoid the necessity of milking by hand or by a milking machine which would be very painful and which would be likely to cause additional injury in view of the fact that scabs must be removed from the teat each day before the milk can be drained. Instruments which have been previously used to drain milk out of the udder, drain the milk through the inside of the tube. By means of my device, however, milk will flow out of the teat through the duct and contact the walls of the duct thereby flushing out the duct with milk. By use of the present device the danger of the loss of the cow or injury to the duct tissues will be reduced to a minimum and the danger of infection will be avoided. It should be particularly noted by considering the drawing that the milk drains on the outside of the tube and flushes the duct of the teat continuously and that the tube may be left in place until the wounds have healed thereby providing a natural way for draining the teat and avoiding danger of infection. It has been found that when this method of draining the teat is used any surgery which may be necessary upon the teat and udder will be greatly facilitated due to the fact that the udder and teat can be properly drained.

It should be noted that the spiral grooves on the outer face of the tube will provide a self-retaining means in the nature of screw threads formed upon the outer face of the tube. These grooves will provide constant flushing channels and will permit constant flushing of the duct on the outside of the tube. This will prevent infection. The device which I have perfected provides a structure which is just the opposite from the conventional instrument now in use which drains the milk through the inside of the tube and this permits infection to occur between the tube and the teat canal, since it is impossible to flush the duct as is possible with my device.

Having described the invention, what is claimed as new is:

A teat draining member for cows and the like comprising, an elongated rod-like member adapted to be inserted and retained in a teat milk duct, said member having one end tapered to a blunt point and provided with an enlarged head on the other end, a plurality of open channels extending in spiral convolutions throughout the length of said member to permit the free flow of milk through said duct completely outside said member and in contact with the wall of the duct, said channels being substantially of semi-elliptical concave cross section with their aggregate area being substantially equal to the exposed surface area of said member, and those edges defining the juncture of said channels with the outer surface of said member being rounded and undercut substantially as described.

HARVEY A. ALCORN.

REFERENCES CITED

The following references are of record in the file of this patent:

UNITED STATES PATENTS

| Number | Name | Date |
| --- | --- | --- |
| 1,045,326 | Ruflin | Nov. 26, 1912 |
| 1,242,314 | Bean | Oct. 9, 1917 |
| 1,688,795 | Aas | Oct. 23, 1928 |

FOREIGN PATENTS

| Number | Country | Date |
| --- | --- | --- |
| 173,912 | Great Britain | Jan. 19, 1922 |
| 186,005 | Great Britain | Sept. 21, 1922 |